US005179782A

United States Patent [19]

Van Alstine

[11] Patent Number: 5,179,782

[45] Date of Patent: Jan. 19, 1993

[54] TIRE GROOVER CUTTING HEAD MEMBER HAVING FIXED INSULATOR

[76] Inventor: Guy A. Van Alstine, 27 W. Cherry Ave., Trappe, Pa. 19426

[21] Appl. No.: 829,913

[22] Filed: Feb. 3, 1992

Related U.S. Application Data

[63] Continuation-in-part of Ser. No. 812,103, Dec. 23, 1991.

[51] Int. Cl.⁵ .............................................. B29D 30/68

[52] U.S. Cl. ......................................... 30/140; 30/293

[58] Field of Search ......................... 30/140, 286, 293; 157/13

[56] References Cited

U.S. PATENT DOCUMENTS

| | | | |
|---|---|---|---|
| 2,097,811 | 11/1937 | Foley | 30/140 |
| 2,140,478 | 12/1938 | Mossback | 30/140 |
| 2,157,151 | 5/1939 | Stackhouse | 30/140 |
| 2,230,042 | 1/1941 | Mertens, Jr. | 30/140 |
| 2,240,382 | 4/1941 | Van Arstine | 30/140 |
| 2,254,974 | 9/1941 | Olson et al. | 30/140 |
| 2,258,027 | 10/1941 | Massback et al. | 30/140 |
| 2,618,056 | 11/1952 | Van Alstine | 30/140 |
| 2,896,059 | 7/1959 | Ruff | 30/140 |
| 2,986,204 | 5/1961 | Wilson et al. | 157/13 |
| 4,797,999 | 1/1989 | Van Alstine | 30/293 |

*Primary Examiner*—Frank T. Yost

*Assistant Examiner*—Hwei-Siu Payer

*Attorney, Agent, or Firm*—James A. Drobile; Daniel H. Golub

[57] ABSTRACT

A cutting head member for controlling the movement of the substantially U-shaped cutting blade of a tire groover is disclosed. The preferred embodiment facilitates the centered movement of the substantially U-shaped cutting blade about an existing groove or cutting path.

9 Claims, 3 Drawing Sheets

TIRE GROOVER CUTTING HEAD MEMBER HAVING FIXED INSULATOR

CROSS REFERENCE TO RELATED APPLICATION

This application is a Continuation-In-Part of copending U S. patent application Ser. No. 07/812,103, filed Dec. 23, 1991.

BACKGROUND OF THE INVENTION

The invention relates generally to the cutting or grooving of rubber or other heat sensitive materials. The invention more particularly relates to the grooving of rubber tires used on various vehicles, including trucks and other motor vehicles and to a cutting head member for a resistance-heated tire groover. The invention also relates to a resistance-heated tire groover that incorporates the disclosed cutting head member and facilitates the grooving of rubber tires in a rapid, efficient, and precise manner.

It has long been known that tires for various vehicles, although worn smooth as a result of extended operation on abrasive road surfaces, nonetheless retain significant amounts of rubber on their circumferential surfaces so that new tread patterns may be cut or "grooved" into such surfaces, thereby allowing the tires to be returned to service and their operable lives extended for thousands of additional miles. Such new tread patterns are typically formed by cutting a new or deepened groove at the precise tread location of an existing groove which has grown shallow as the tire has worn. By "superimposing" a new or deepened groove at the precise location of a worn groove, the original tire tread pattern can be recreated. It is believed that the performance of a regrooved tire is adversely affected when the original tread pattern is not accurately recreated.

Previous tire groovers have operated by means of a heated cutting blade that slices through the rubber material on the circumferential surface of the tire being grooved. Such a tire groover is discussed and referenced in U.S. Pat. No. 4,797,999, to Van Alstine, which is hereby incorporated in its entirety herein by reference. The tire groover shown in the U.S. Pat. No. 4,797,999, patent employed a plurality of slidable metal clamping spacers for securing the ends of the U-shaped blade to the cutting head housing. The ends of the U-shaped blade where interposed between metal spacers, and a floating insulator was slidably interposed between the metal spacers at a location between the ends of the blade. A single tightening means abutting one of the metal clamping spacers was provided. The single tightening means acted to secure (and squeeze) both ends of the blade, the metal clamping spacers, and the floating insulator against each other and the housing.

The dimensions of U-shaped cutting blades for use in conjunction with known tire groovers vary significantly. For example, different thicknesses of metal can be used to formulate such blades. In addition, different blade widths are often employed depending upon the width of the desired groove. As a result of these variations in blade dimension, it was found that the cutting blade, once secured by the tightening means, was often not in a centered position with respect to the housing of tool. Since an operator typically uses the tool's housing as an indicator for guiding the tool along an existing worn groove, it was found that such an off-center orientation often resulted in the creation of a new groove which did not coincide in position with the worn groove. The off-center orientation of the blade thus made it difficult for an operator to accurately recreate the original tread pattern.

FIG. 1 is an exemplary diagram showing a cross-sectional view of a known cutting member 10 holding a substantially U-shaped blade 20. Cutting head member 10 has first and second subhousings 10*a*, 10*b*, respectively. First and second subhousings 10*a*, 10*b* are separated by a distance H. A plurality of metal clamping spacers 30 are slidably interposed between subhousings 10*a*, 10*b*. A floating insulator 40, for electrically insulating metal clamping spacers 30 on either side of floating insulator 40, is slidably interposed within metal clamping spacers 30. Blade 20 has a width W and is formed in part from first and second ends 20*a*, 20*b* which are interposed between metal clamping spacers 30. A screw 50 is threadably engaged to second subhousing 10*b* so that when screw 50 is tightened, first and seconds end 20*a*, 20*b*, metal clamping spacers 30 and floating insulator 40 tighten against each other and against subhousing 10*a*.

As shown in FIG. 1, as screw 50 is tightened, first and second ends 20*a*, 20*b* are symmetrically compressed so that they are no longer separated by a distance W. In addition, the metal clamping spacers 30, fixed insulator 40 and blade 20 all shift to the left a distance T as screw 50 is tightened. Once screw 50 is tightened, it can be seen that blade 20 is no longer centered with respect to subhousings 10*a*, 10*b*. More particularly, once screw 50 is tightened, blade 20 is "off-center" a distance d.

It is an object of this invention to eliminate the of-center orientation of the cutting blade in known tire groovers.

It is a further object of this invention to enable an operator to profile a cutting blade within a cutting head in a non-symmetrical shape.

These and other objects of the invention will be better appreciated after reading the succeeding description of the invention in conjunction with the accompanying drawing.

SUMMARY OF THE INVENTION

The disclosed invention provides a cutting head member for controlling the movement of a cutting blade of a resistance-heated tire groover. The preferred embodiment facilitates the movement of a substantially U-shaped cutting blade about an existing groove or cutting path. In accordance with the present invention, an apparatus for cutting a tire groove comprises a first floating metal clamping means for engaging one end of the cutting blade against the first floating metal clamping means, a second floating metal clamping means for engaging the other end of the cutting blade against the second floating metal clamping means, and a fixed insulating means for electrically insulating the first and second floating metal clamping means from each other. The fixed insulating means is rigidly interposed between the first and second floating metal clamping means. The invention also includes a first tightening means for tightening the first floating metal clamping means and one end of the blade against the fixed insulating means, and a second tightening means for tightening the second floating metal clamping means and the other end of the blade against the fixed insulating means. In a preferred embodiment, the first and second tightening means are each comprised of threaded locking pieces which respectively abut the first and second floating metal clamping means. In a further embodiment, the threaded locking pieces are threaded in opposite directions to facilitate rapid blade replacement. In a still further embodiment, the cutting blade ends may be interposed within the first and second floating metal clamping means so as to profile the cutting blade in a non-symmetric shape by selectively applying the first and second tightening means.

DETAILED DESCRIPTION OF THE PREFERRED EMBODIMENT OF THE INVENTION

Figure 1:
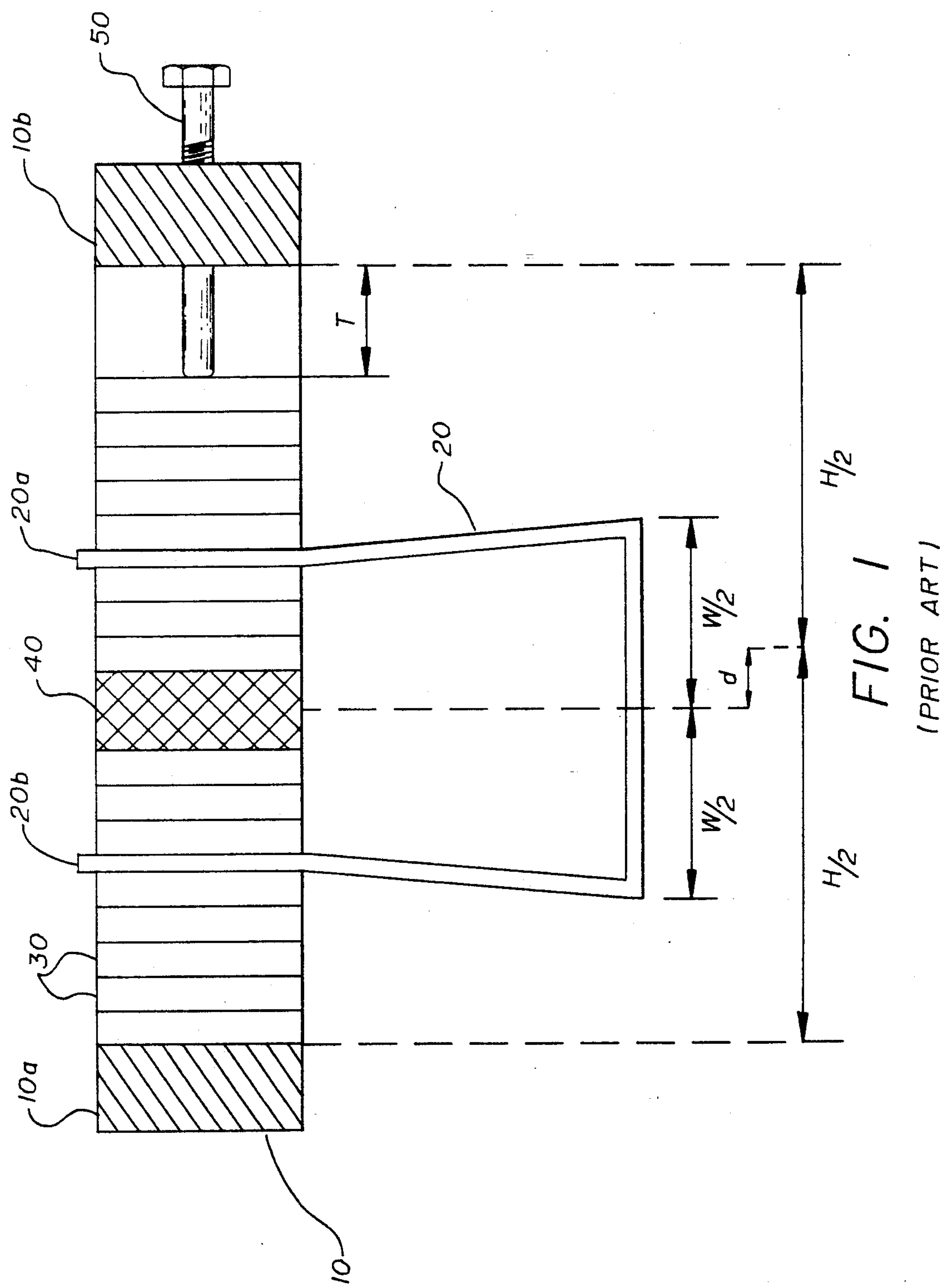
FIG. 1 is an exemplary diagram showing a cross-sectional view of a known cutting head member for holding a substantially U-shaped cutting blade.
Figure 2:
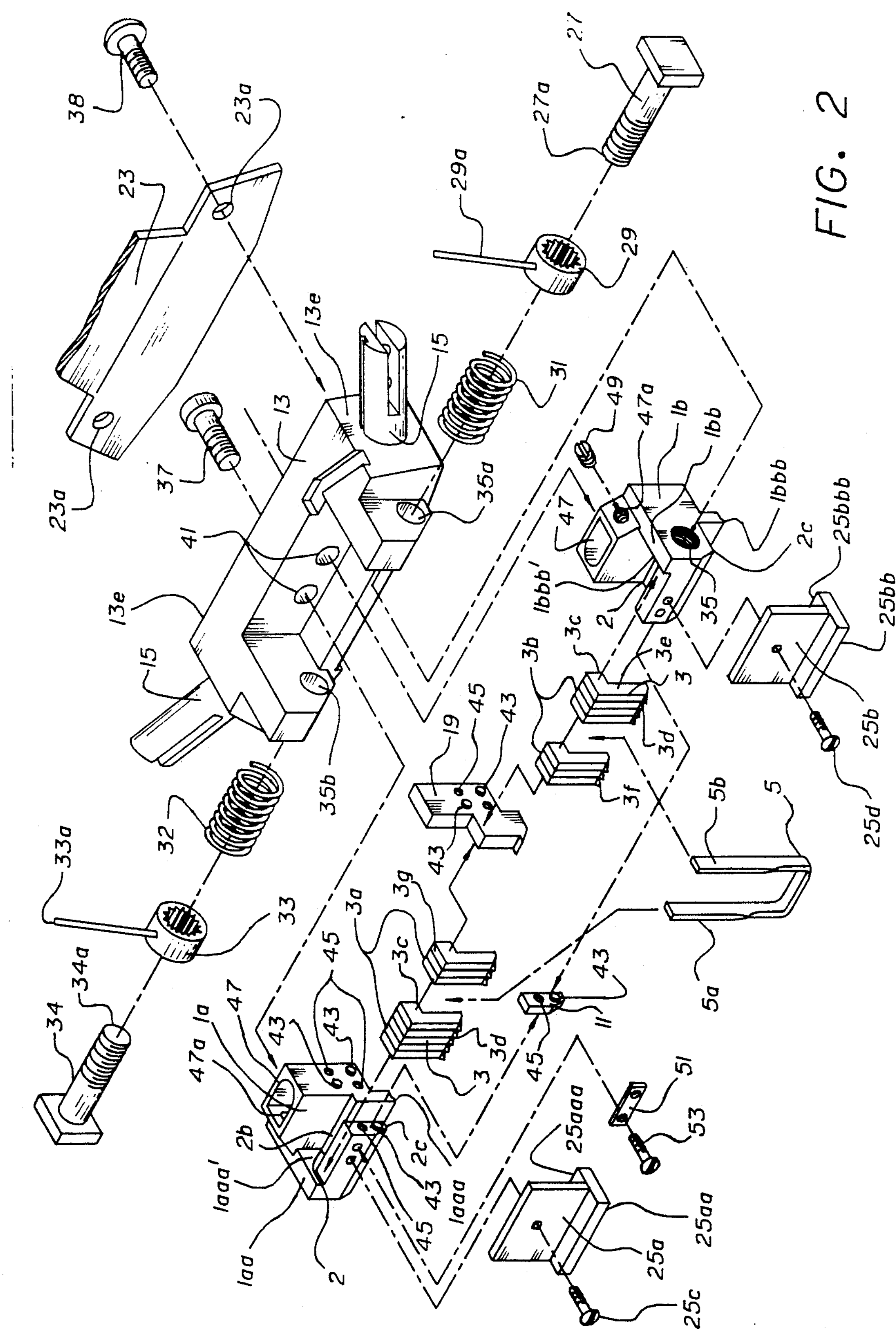
FIG. 2 is a partial perspective view in "exploded" form of the preferred embodiment of the present invention.

Referring now to FIG. 2, there is shown a pull type tire groover incorporating a preferred embodiment of the present invention. More particularly, there are shown a plurality of floating metal clamping spacers 3 and a substantially U-shaped metal cutting blade 5 for cutting a groove in the circumferential (or road gripping) surface of a tire. Cutting blade 5 has first and second ends 5*a*, 5*b*. First and second floating metal clamping means, designated 3*a*, 3*b*, respectively, are provided for engaging respective first and second ends 5*a*, 5*b*. First and second floating metal clamping means 3*a*, 3*b* are comprised of a plurality of floating metal clamping spacers 3. A fixed insulating means 19 for electrically insulating first floating metal clamping means 3*a*from second floating metal clamping means 3*b* is rigidly interposed between first floating metal clamping means 3*a* and second floating metal clamping means 3*b*. First tightening means 34 is provided for tightening first floating metal clamping means 3*a* and first end 5*a* against fixed insulating means 19. Second tightening means 27 is provided for tightening second floating metal clamping means 3*b* and second end 5*b* against fixed insulating means 19. In the preferred embodiment shown, first and second tightening means 34, 27 are comprised of threaded locking pieces which respectively abut first and second floating metal clamping means 3*a*, 3*b*. The threaded locking pieces comprising the first and second tightening means 34, 27 are preferably threaded in opposite directions.

Referring still to FIG. 2, there is shown head holder 13 which is adapted to receive and retain sub-housings 1*a* and 1*b* in rigid engagement with each other. Handles 15 for pulling head holder 13 are rigidly attached to the slanted sides 13*e* of head holder 13, so that handles 15 extend upwardly from head holder 13 at a slight angle, thereby increasing control and maneuverability of the apparatus by an operator. Subhousings 1*a* and 1*b* are electrically insulated from each other by fixed insulators 11 and 19. First and second floating metal clamping means 3*a*, 3*b* are slidably interposed within sub-housings 1*a*, 1*b*. Fixed insulator 19 is rigidly interposed within cutting head member 1 and between first and second floating metal clamping means 3*a*, 3*b* so that the first floating metal clamping means 3*a* on one side of fixed insulating means 19 is retained within sub-housing 1*a*, and the second floating metal clamping means 3*b* on the other side of fixed insulating means 19 is retained within sub-housing 1*b*.

Figure 3:
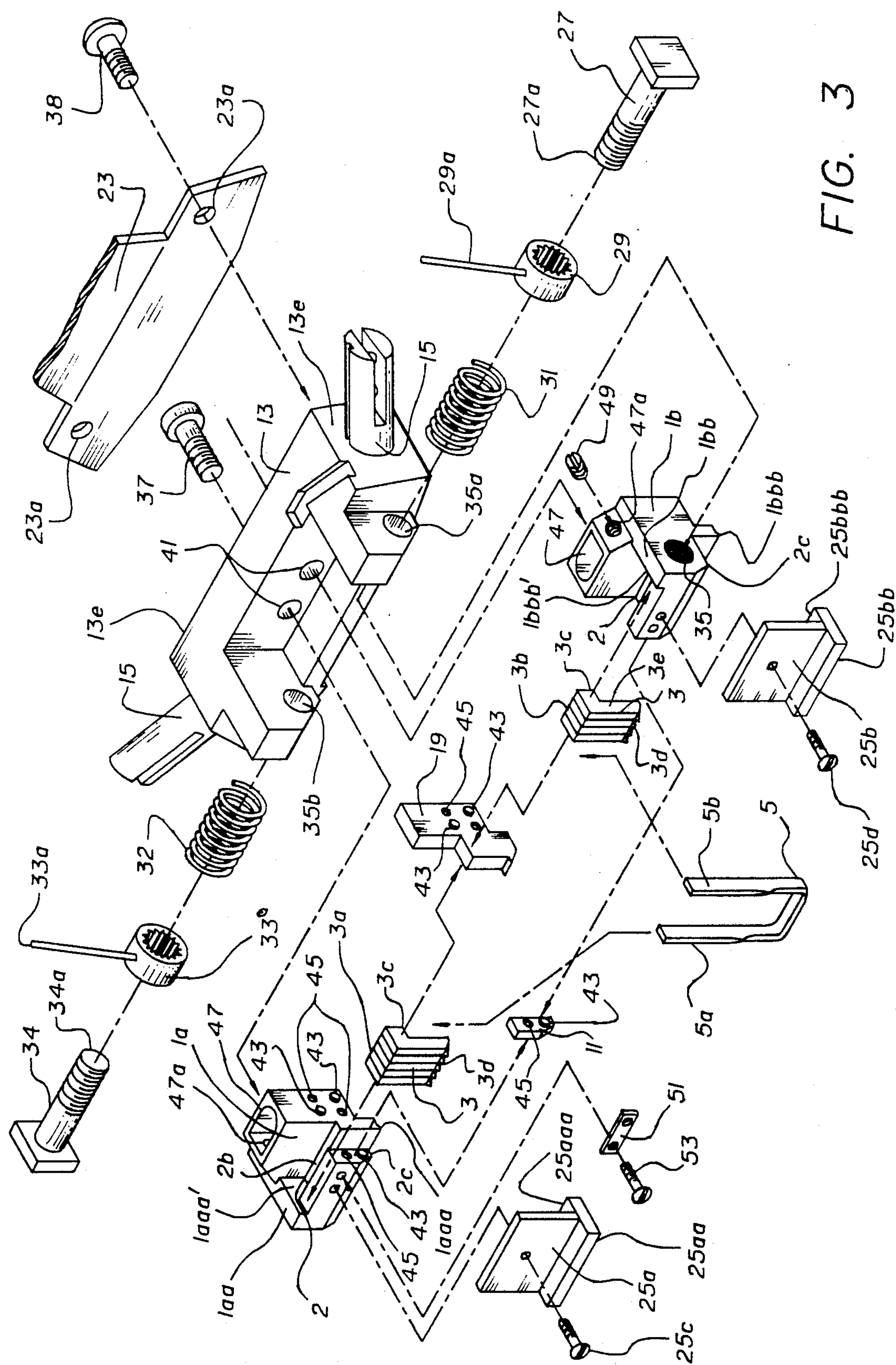
FIG. 3 is a partial perspective view in exploded form of an alternate preferred embodiment of the present invention.

Threaded locking piece 34 is provided for tightening first floating metal clamping means 3*a* and first end 5*a* against each other and against fixed insulating means 19. As shown in FIG. 2, first end 5*a* may be interposed between a plurality of floating metal clamping spacers 3. Alternatively, as shown in FIG. 3, first end 5*a* may be interposed between a metal clamping spacer 3 on one side and fixed insulating means 19 on the other side. In the case when end 5*a* directly abuts fixed insulating means 19, first floating clamping means 3*a* may be comprised of a single metal clamping spacer 3. Threaded locking piece 27 is provided for tightening second floating metal clamping means 3*b* and second end 5*b* against each other and against fixed insulating means 19. Second end 5*b* may be interposed between a plurality of metal clamping spacers 3. Alternatively, as shown in FIG. 3 second end 5*b* may be interposed between a metal clamping spacer 3 on one side and fixed insulating means 19 on the other side. In the case when end 5*b* directly abuts fixed insulating means 19, second floating metal clamping means 3*b* may be comprised of a single metal clamping spacer 3. In a further alternative embodiment, ends 5*a*, 5*b* may be inserted on respective sides of fixed insulating means 19 so that an unequal number of floating metal clamping spacers 3 are interposed between end 5*a* and fixed insulating means 19, on the one hand, and between end 5*b* and fixed insulating means 19, on the other hand. Direct electrical current is provided to sub-housings 1*a*, 1*b* from an external transformer source (not shown) through receptacles 47.

The positioning of first and second tightening means 34, 27 on either side of fixed insulating means 19 allows an operator to selectively tighten ends 5*a*, 5*b* against first and second floating metal clamping means 3*a*, 3*b*, respectively. In other words, an operator may tighten end 5*a* against first floating metal clamping means 3*a* before tightening end 5*b* against second floating metal clamping means 3*b*. This ability to selectively tighten ends 5*a*, 5*b* allows an operator to center blade 5 and at the same time profile blade 5 in a non-symmetric shape. For example, an operator may tighten end 5*a* in a vertical orientation and, having end 5*b* free to move, position end 5*b* in an angular orientation before interposing and tightening end 5*b* against second floating metal clamping means 27.

Sub-housings 1*a* and 1*b* of cutting head member 1 have a longitudinal channel 2 formed therein. Channel 2 extends vertically through sub-housings 1*a* and 1*b* from upper external surfaces 1*aa* and 1*bb* to lower external surfaces 1*aaa* and 1*bbb*. Channel 2 terminates horizontally at interior surfaces 1*aaa'* and 1*bbb'* of sub-housings 1*a* and 1*b*. The walls of channel 2 are configured to incorporate upper bearing surface 2*b* and lower bearing surface 2*c*. Clamping spacers 3 have upper retaining surfaces 3*c* and lower retaining surfaces 3*d* formed therein. When clamping spacers 3 are interposed within channel 2, upper retaining surfaces 3*c* slidably engage upper bearing surface 2*b*, and lower retaining surfaces 3*d* slidably engage lower bearing surface 2*c*.

Engagement of sub-housing 1*a* to sub-housing 1*b* with fixed insulators 11 and 19 interposed between them is facilitated by a plurality of locating dowels 43 and corresponding locating receptacles 45 formed into sub-housings 1*a* and 1*b* and fixed insulators 11 and 19. Thus, clamping spacers 3 are slidably interposed and retained within channel 2 of sub-housings 1*a* and 1*b*, and fixed insulators 11 and 19 are rigidly positioned between sub-housings 1*a* and 1*b* so that head holder 13 may receive sub-housings 1*a* and 1*b* and hold them in rigid engagement to each other with fixed insulators 11 and 19 rigidly interposed between them. In an alternative embodiment (not shown), fixed insulators 11, 19 may be combined to form a single fixed insulating means. Fixed insulating means 19 may be formed from a layer of laminated insulating material interposed between two layers of steel or other metallic material. Sub-housings 1*a* and 1*b* are rigidly retained within head holder 13 by means of a plurality of bolts 37 which pass through holes 41 in head holder 13 and threadably engage sub-housings 1*a* and 1*b*. In order to secure sub-housings 1*a* and 1*b* to each other, bracing piece 51 is regidly attached by screws 53 to sub-housings 1*a* and 1*b*.

Head holder 13 is provided with aperture 35*a*, through which threaded locking piece 27 may be interposed and threadably engaged within threaded aperture 35 of sub-housing 1*b*. It will be understood that, when threaded locking piece 27 is sufficiently advanced so that the shank end 27*a* of threaded locking piece 27 protrudes horizontally through sub-housing 1*b*, shank end 27*a* of threaded locking piece 27 will abut planar surface 3*e* of the particular clamping spacer 3 that is immediately adjacent to threaded aperture 35 of sub-housing 1*b*. It will further be appreciated that, as threaded locking piece 27 is advanced in the direction of a normal right-handed screw, the second floating metal clamping means 3*b* will be caused to tighten against end 5*b* as described herein. Head holder 13 is similarly provided with aperture 35*b*, through which threaded locking piece 34 may be interposed and threadably engaged within a corresponding threaded aperture (not shown) of sub-housing 1*a* . It will be understood that, when threaded locking piece 34 is sufficiently advanced so that the shank end 34*a* of threaded locking piece 34 protrudes horizontally through sub-housing 1*a*, shank end 34*a* of threaded locking piece 34 will abut planar surface 3*e* of the particular clamping spacer 3 that is immediately adjacent to the threaded aperture of sub-housing 1*a* . It will further be appreciated that, as threaded locking piece 34 is advanced in the direction of a normal right-handed screw, the first floating metal clamping means 3*a* will be caused to tighten against end 5*a* as described herein.

Sub-housings 1*a*, 1*b* have receptacles 47 formed therein, with threaded apertures 47*a* and threaded inserts 49 adapted to be tightened against the ends of primary electrical conductors (not shown) after they are inserted in receptacles 47. Mounting plate 23 is attached to head holder 13 by a plurality of screws 38 that pass through apertures 23*a* of mounting bracket 23 and threadably engage head holder 13. After an operator has selected a cutting blade 5 desired for a particular grooving operation, threaded locking pieces 27, 34 must be sufficiently withdrawn to allow enough clearance so that end 5*a* of cutting blade 5 may be interposed between the metal clamping spacers 3 in contact with sub-housing 1*a* on one side of fixed insulator 19, and so that the other end 5*b* of cutting blade 5 may be interposed between the metal clamping spacers 3 in contact with subhousing 1*b* on the other side of fixed insulator 19. In order to facilitate the insertion of ends 5*a*, 5*b* of cutting blade 5, lower edges 3*f* of clamping spacers 3 are formed into an acute angle which provides for easy separation of clamping spacers 3. Depending upon the depth of the groove desired to be cut, cutting blade 5 may be inserted between clamping spacers 3 so that ends 5*a*, 5*b* protrude an appropriate distance above the upper surfaces 3*g* of clamping spacers 3.

Socket piece 29 having handle extension 29*a* is adapted to be retained by threaded locking piece 27 and to slidably engage head end 27*b* of threaded lock piece 27. Socket piece 29 is biased into engagement with head end 27*b* of threaded locking piece 27 by biasing spring 31. In this manner, socket piece 29 may be rotated to advance or withdraw threaded locking piece 27, as necessary, to effect removal, replacement or adjustment of end 5*b*. Similarly, socket piece 33 having handle extension 33*a* is adapted to be retained by threaded locking piece 34 and to slidably engage head end 34*b* of threaded lock piece 34. Socket piece 33 is biased into engagement with head end 34*b* of threaded locking piece 34 by biasing spring 32. In this manner, socket piece 33 may be rotated to advance or withdraw threaded locking piece 34, as necessary, to effect removal, replacement or adjustment of end 5*a*.

Referring still to FIG. 2, first and second stabilizer members 25*a*, 25*b* for accurately positioning and guiding cutting head member 1 along the circumferential rubber surface of a tire being grooved are secured to cutting head member 1 by screws 25*c*, 25*d*. First and second stabilizer members 25*a*, 25*b* are defined by forward edges 25*aa*, 26*bb*, respectively, and rearward edges 25*aaa*, 26*bbb*, respectively. Forward edges 25*aa*, 25*bb* lie in front of a reference line normal to the cutting direction passing through blade 5. In order to further enhance control of the tool, frictional forces between first and second stabilizing members 25*a*, 25*b* and the road gripping surface of a tire being grooved may be reduced by constructing stabilizing members 25*a*, 25*b* of a friction-reducing material such as that manufactured by E. I. du Pont de Nemours and Company under the trademark "TEFLON".

It will be appreciated that there are considerable variations that can be accomplished in an apparatus of the invention without departing from its scope. As a result, although the preferred embodiment of an apparatus of the invention has been described above, it is emphasized that the invention is not limited to the preferred embodiment, and there exist alternative embodiments that are fully encompassed within the invention's scope, which is intended only to be limited by the scope of the appended claims.

What is claimed is:

1. An apparatus for cutting a groove in a tire comprising:

a. first floating metal clamping means for engaging a first end of a substantially U-shaped cutting blade against said first floating metal clamping means;

b. second floating metal clamping means for engaging a second end of said substantially U-shaped cutting blade against said second floating metal clamping means;

c. fixed insulating means for electrically insulating said first floating metal clamping means from said second floating metal clamping means, said fixed insulating means being rigidly interposed between said first and second floating metal clamping means;

d. first tightening means for tightening said first floating metal clamping means and said first end against said fixed insulating means; and e. second tightening means for tightening said second floating metal clamping means and said second end against said fixed insulating means.

2. The apparatus of claim 1, wherein said first tightening means comprises a first threaded locking piece abutting said first floating metal clamping means so that, when said first threaded locking piece is advanced, said first floating metal clamping means and said first end are tightened against each other and against said fixed insulating means.

3. The apparatus of claim 2, wherein said second tightening means comprises a second threaded locking piece abutting said second floating metal clamping means so that, when said second threaded locking piece is advanced, said second floating metal clamping means and said second end are tightened against each other and against said fixed insulating means.

4. The apparatus of claim 3, wherein said first and second locking piece are threaded in opposing directions.

5. The apparatus of claim 1, wherein said first end abuts said fixed insulating means.

6. The apparatus of claim 1, wherein said second end abuts said fixed insulating means.

7. The apparatus of claim 1, wherein said first and second floating metal clamping means are each formed from at least one floating metal clamping spacer.

8. The apparatus of claim 7, wherein the number of floating metal clamping spacers between said first end and said fixed insulating means is not equal to the number of floating metal clamping spacers between said second end and said fixed insulating means.

9. The apparatus of claim 1, wherein said first and second ends of said cutting blade are profiled in a non-symmetric orientation.

* * * * *